2,804,442

AMINOPLASTS

William A. Laurie, Springfield, Mass., assignor to Monsanto Chemical Company, St. Louis, Mo., a corporation of Delaware No Drawing. Application April 7, 1953,
Serial No. 347,403

10 Claims. (Cl. 260—45.2)

This invention relates to thermosetting aminoplasts. More particularly the invention relates to modified aminoplasts and to a method for preparing them.

Aminoplasts may be defined as synthetic resins of the thermosetting type which are prepared by reacting an organic compound containing a plurality of amino groups with an aldehyde or ketone. They may be prepared in a soluble, fusible form and then cured to an insoluble, infusible state. For other purposes they are first prepared in an insoluble but still fusible state after which they are cured to the infusible state. Many problems arise in attempting to obtain the fusible products in a readily flowable state and in attempting to prepare dispersions of the insoluble but fusible resins.

One object of this invention is to modify aminoplasts.

A further object of this invention is to increase the plasticity or flowability of aminoplasts in the fusible state.

Another object is to modify aminoplasts so that in their insoluble fusible state they may be readily dispersed in aqueous media.

A specific object of this invention is to prepare new melamine formaldehyde condensates.

These and other objects are attained by reacting an organic compound containing a plurality of amino groups with an aldehyde or ketone and with a polyamide acid or salt of such polyamide acid.

The following examples are given in illustration and are not intended as limitations on the scope of this invention. Where parts are mentioned they are parts by weight.

Example I

Mix 125 parts of melamine with 200 parts of formalin (37% formaldehyde) and adjust the pH of the mixture to about 8–9. Heat the mixture at reflux temperature and atmospheric pressure until the 0° C. hydrophobe point is reached. Then add 2 parts of a sodium salt of a polyamide acid derived from polyacrylonitrile by partial alkaline hydrolysis thereof, said polyamide acid having a nitrogen content of about 3% by weight and a molecular weight of about 70,000. Heat the reaction mixture at reflux temperature and atmospheric pressure for about 40 minutes. Then dehydrate the reaction product to obtain a white powder which is partially soluble in water and fusible. It can be cured to an insoluble, infusible form by heating it without added catalysts at temperatures from 100° C. to 250° C. The powder flows to a greater extent under molding conditions than does a molding powder made from melamine and formaldehyde without the modification. It is particularly suitable for large moldings and highly filled molding powders which require increased flow to fill out the mold.

Example II

React together 120 parts of urea and 200 parts of formalin at reflux temperature and atmospheric pressure for about 30 minutes at a pH of about 7. Then add to the reaction medium 0.5 part of a sodium salt of a polyamide acid derived from polyacrylonitrile by hydrolysis thereof, said polyamide acid having a nitrogen content of about 2% by weight and a molecular weight of about 70,000. Continue the heating at reflux temperature and atmospheric pressure for about 30 minutes. Dehydrate the reaction product by vacuum distillation to obtain a water-dispersible white powder. Mix the powder with an equal weight of wood flour and mold the mixture under heat and pressure into the form of a cup. The molding process can be carried out at relatively low temperatures compared to unmodified urea-formaldehyde molding powders but the increased flowability of the new resin permits complete filling out of the mold at the lower molding temperatures.

Example III

React together 120 parts of urea and 400 parts of formalin at about 90° C. and a pH of 7–9 for about 1 hour under reflux. Then adjust the pH to 5–7 with formic acid and continue the heating at 90° C. for another hour. Adjust the pH to about 7 with sodium hydroxide and add 2 parts of a sodium salt of a polyamide acid derived from polyacrylonitrile by hydrolysis thereof, said polyamide acid having a nitrogen content of about 3% and a molecular weight of about 70,000. Heat the reaction medium at about 90° C. until a 25° C. viscosity of about 250 cps. is obtained. The product is a clear syrup. Apply the syrup without further modification to a smooth or porous surface such as glass, metal, cellophane tape, paper, textile, etc. to obtain a thin film thereon. Dry the film at about 30° C. The dried film adheres tenaciously to the material to which it is applied and the surface of the film is smooth and non-tacky. However, when the exposed surface of the film is remoistened with water it becomes quite tacky enabling the coated material to be cemented to other materials. When the final product such as a two-ply paper laminate is made, the bond may be rendered insoluble and infusible by heating the laminate to 100° C. or higher preferably under pressure.

Example IV

Mix together 125 parts of melamine and 200 parts of formalin and adjust the pH of the mixture to about 8–9. React the mixture at reflux temperature and atmospheric pressure to a 0° C. hydrophobe point. Now add 40 parts of toluene sulfonamide and adjust the pH to about 7. Heat the reaction medium at about 60° C. until a clear solution is obtained. Then add 0.6 part of a sodium salt of a polyamide acid derived from polyacrylonitrile by the partial hydrolysis thereof said polyamide acid having a nitrogen content of about 2.5% and a molecular weight of about 70,000. Adjust the pH to from 7.5–8.5 with a suitable buffer and add 2.4 parts of glyceryl monoricinoleate. Heat the reaction mixture at reflux temperature and atmospheric pressure with constant agitation for about 30 minutes and then dilute with water by slow addition thereof under constant agitation and while maintaining the temperature of at least 80° C. Add enough water in this manner to obtain a product having about 30% solids by weight. The product is a latex which is stable over extended periods of time. It may be used as such for the treatment of paper and textiles as a sizing agent therefor or for the treatment of cellulose pulp for pulp molding operations. It increases the wet strength of paper and renders textile fabrics substantially shrinkproof.

The latices thus prepared may be dried by conventional methods such as spray, drum or oven drying to obtain a white amorphous powder which is readily redispersible in water. The powder may be cured to an insoluble, non-dispersible and infusible state by heating it from about 100° C. to about 250° C. The powder or the latex may be added to aqueous dispersions of cellulosic fibers in a hollander or beater with a subsequent retention of better than 90% of the added resin on the cellulosic fibers. The resins in the fusible state have relatively high flowability so the pulp moldings made therewith have a high gloss, high penetration of the fibers with resin and substantially no extension of the fibers out of the surface of the molded articles.

*Example V*

Add 35 parts of cellulosic fibers derived from wood pulp to 220 parts of a 30% solids latex prepared as in Example IV. Stir the fibers into the emulsion until they are thoroughly dispersed therein. Then felt the fibers on a preform in the shape of a tray. Dry the preform in an oven at about 100° C. It will be found that over 90% of the resin in the latex is deposited in and around the fibers. Mold the preform under heat and pressure at about 200° C. and 500 p. s. i. On cooling, a finished tray is obtained which has a hard glossy surface which is resistant to alkalis, water and organic solvents.

*Example VI*

Mix together 100 parts of melamine, 25 parts of phenyl melamine and 200 parts of formalin and adjust the pH of the mixture to about 8–9. React the mixture at reflux temperature and atmospheric pressure to the 0° C. hydrophobe point. Now add 0.6 part of a sodium salt of a polyamide acid derived from polyacrylonitrile by hydrolysis, said polyamide acid containing about 2.5% nitrogen and having a molecular weight of about 80,000. Add 3 parts of sodium oleate and adjust the pH to 7.5–8.5. Heat the reaction mixture at reflux temperature and atmospheric pressure for about 60 minutes and then dilute with water while maintaining the temperature at 80° C. or above. Constant agitation should be maintained after the addition of the sodium oleate. When dilution has proceeded far enough to yield a 30% solids solution, cool the reaction mixture. The product is a stable latex similar in properties to the latex obtained in Example IV except that it has even greater flowability. This latex is particularly valuable for use in preparing very large pulp moldings where flowability is of paramount importance.

*Example VII*

Mix together 125 parts of melamine and 200 parts of formalin and adjust the pH to about 8–9. Heat the mixture at reflux temperature and atmospheric pressure until the 0° C. hydrophobe point is reached. Then add to the reaction mixture 2 parts of a polyamide acid derived by the amidation of an isobutylene-maleic anhydride copolymer having a molecular weight of about 75,000, said polyamide acid having a nitrogen content of about 4% by weight. Heat the reaction mixture at reflux temperature and atmospheric pressure for about 35 minutes and then dehydrate the product by spray drying. The product is a white amorphous powder, partially soluble and readily dispersible in water. It is still fusible and may be cured to an insoluble, infusible state by heating it at 100° C. to 250° C. The product may be used as a molding powder or as an aqueous dipersion to treat fibers, paper, textiles, etc.

*Example VIII*

Disperse 100 parts of a partial butyl ether of methylol melamine in 100 parts of water and add thereto 1 part of a sodium salt of a polyamide acid derived from polyacrylonitrile by hydrolysis, said polyamide acid having a nitrogen content of about 8% by weight and a molecular weight of about 70,000. Heat the dispersion at 80–90° C. for about 1 hour. The product is an aqueous solution which may be used directly as a coating composition without further modification or with conventional additives such as water-dispersible alkyd resins, pigments, dyes, fillers etc. The aqueous solution may be dried by conventional means to produce a water-soluble, organo-soluble, white, amorphous powder. Coatings prepared with this resin in conjunction with oils and alkyd resins have a high gloss and good chemical resistance.

*Example IX*

Mix together 126 parts of melamine and 240 parts of formalin. Heat the mixture at reflux temperature and atmospheric pressure to the 0° C. hydrophobe point. Then add to the reaction medium 1 part of a sodium salt of a polyamide acid derived from polyacrylonitrile by hydrolysis, said polyamide acid having a nitrogen content of about 3% by weight and a molecular weight of about 60,000. Heat the reaction medium at 80–90° C. for about 1 hour and then cool to obtain a water solution of the co-condensation product having a viscosity of about 300 cps. This solution may be used directly as a laminating syrup for paper, wood, textiles etc. The co-condensate has a relatively high flow at low volatile content so that laminates prepared therefrom avoid the common defects attributable to the high volatile content necessary for the unmodified melamine-formaldehyde condensates.

*Example X*

Mix together 126 parts of melamine, 200 parts of formalin, 65 parts of toluene sulfonamide, 2 parts of sodium oleate, and 2 parts of a sodium salt of a polyamide acid derived from polyacrylonitrile by hydrolysis, said polyamide acid having a nitrogen content of about 2% by weight and a molecular weight of about 70,000. Add 240 parts of water, and stir at room temperature for about 30 minutes. Adjust the pH to 7.5–8.7 and heat the mixture at 90° C. for about 40 minutes with constant and vigorous agitation. Then dilute the mixture with about 260 parts of water with constant agitation at a temperature above 80° C. to obtain a 30% solids latex having a 25° C. viscosity of about 200 cps. This latex may be used without further modification for impregnating paper, textiles, cellulosic fibers etc. to deposit the resin from the latex onto the treated material followed by drying and curing at elevated temperatures. The latex may also be dried by conventional methods and the dried material used either as a molding powder, as an ingredient in a surface coating composition or upon redispersing it in water as a sizing agent for paper, textiles and other fibrous materials such as asbestos.

There are three essential ingredients for making the compositions of this invention. The first is an organic compound containing a plurality of amino groups, each amino group containing at least one active hydrogen atom. Among the compounds which may be used are urea, thiourea, cyclic ethylene urea, dicyandiamide, guanamines, guanides, biguanides, aliphatic polyamines, diazines, and triazines. Among the triazines which may be used are melamine, alkyl melamines, aryl melamines, isomelamines, ammeline, etc. Two or more of these organic amino compounds may be used. The organic amino compounds may be further classified as carbamides which include urea and derivatives thereof, aminoazines which include melamine and derivatives thereof and polyamines.

The second essential ingredient of the compositions is an aldehyde or ketone or a mixture thereof. For the majority of applications of the compositions, formaldehyde is the preferred reactant since it gives properties quite different from most of the other aldehydes and the ketones. However, to obtain special effects other aldehydes or ketones may be substituted for the formaldehyde in whole or in part. Among the aldehydes which may be used are saturated aliphatic and aromatic aldehydes, alkoxy aldehydes, heterocyclic aldehydes, and cyclic aldehydes, for example, acetaldehyde, butyraldehyde, heptaldehyde, benzaldehyde, furfural etc. Ketones such as methyl ethyl ketone, acetone, acetophenone, cyclohexanone etc. may also be used. The amount of aldehyde or ketone to be used should be based on the number of amino groups in the organic compound and the number of active hydrogen atoms in the amino groups and should be regulated to from 0.2 to 1 mol of aldehyde or ketone per active hydrogen atom. For example, melamine contains six active hydrogen atoms on the three amino groups so that the range required for melamine is from 1.2–6 mols of formaldehyde per mol of melamine. For laminating syrups, and sizing emulsions, best results are obtained when about 0.5 mol of aldehyde is used for each active hydrogen atom.

The third essential ingredient of the compositions is a poly amide acid or a salt thereof. These materials are organic compounds containing a plurality of carboxyl groups and a plurality of amide groups. The amide groups may contain a single substituent on the nitrogen atom. The poly amide acids should contain at least 10 carboxylic acid groups of which no more than 40% should be amidized. For best results the number of carboxylic acid groups should be at least 100 and may be as high as 2000. It is impractical to count the number of amide groups on such a large molecule so resort must be had to nitrogen analysis to describe the limits of the invention. The actual existence of the amide groups can be readily proven by infrared analysis. The operable poly amide acids are compounds containing from 1 to 15% nitrogen by weight. They are are best obtained by polymerization of monomeric materials which contain carboxylic acid groups, amide groups or groups hydrolyzable to give both acid and amide groups, e. g. nitrile groups. The molecular weight of the poly amide acids should be at least 10,000.

One method for preparing the poly amide acids of this invention is to polymerize acrylonitrile or an alpha substituted acrylonitrile to the desired molecular weight and then to hydrolyze the polymer, stopping the hydrolysis when the desired nitrogen content is obtained. Another method is to polymerize acrylic acid or alpha substituted acrylic acids to the desired molecular weight, followed by amidation at relatively high temperatures with ammonia. This method, unless carefully controlled, tends to degrade the polymer but if the original molecular weight is high enough, the degradation is not severe enough to produce an inoperable product. Another method is to copolymerize an acrylic acid with an acrylamide using the proportion of acrylamide corresponding to the nitrogen content desired in the polyamide acid.

Still another method of preparing the polyamide acids is to copolymerize a vinylidene compound containing no carboxylic acid groups with an ethylenically unsaturated acid copolymerizable therewith followed by amidation of the polymer. For this purpose the butenedioic acids which form inner anhydrides are preferred since the amidation reaction proceeds more smoothly and at lower temperatures when the acid is present in the form of an inner anhydride than when the acid radical itself must be amidated. Maleic acid is the most useful of these dioic acids. The vinylidene compounds forming the first part of the copolymer may be aliphatic or aromatic ethylenically unsaturated hydrocarbons or they may be vinyl compounds such as vinyl esters, vinyl ethers, vinyl halides, etc. It is also possible and quite feasible to prepare terpolymers from a vinylidene compound containing no acid or amide groups with an ethylenically unsaturated acid and with an ethylenically unsaturated amide or an ethylenically unsaturated compound containing groups hydrolyzable to an amide group or to both acid and amide groups.

When the polyamide acids are made by hydrolysis of an acrylonitrile polymer or copolymer, the acids are usually obtained in the form of their salts and since the hydrolysis is best carried out with sodium hydroxide the salts are usually the sodium salts. These sodium salts may be used directly and the presence of the sodium ions does not materially change the course of the reaction. Other alkali metal salts, ammonium salts and alkaline earth metal salts may be used since all of these salts are either water-soluble or water-dispersible and enter into the reaction without difficulty.

The amount of polyamide acid should be used in concentrations varying between 0.1 and 25% by weight based on the combined weight of the organic amino compound and the aldehyde or ketone. The polyamide acids are at least partially water-soluble and tend to impart water-solubility to the condensation products of organic amino compound and aldehyde or ketone. However, if the reaction is continued for a longer period of time than is necessary to form the initial condensation products, water-solubility is gradually reduced and water-insoluble products which are still fusible can be obtained by prolonged heating. This latter material i. e. the insoluble and fusible resin is redispersible in water.

The reaction between the three essential components of the compositions of this invention may take place simultaneously or the organic amino compound and the aldehyde or ketone may be condensed and the resulting condensation product then reacted with the polyamide acid. If all three ingredients are reacted together at the same time, the pH of the reaction should be controlled between the limits of 7.5–9 and at temperatures between 50° C. and reflux temperature at atmospheric pressure. The reaction is carried out to the hydrophobe point if a water-soluble material is desired and for about 15 minutes to 30 minutes after the hydrophobe point is reached if an insoluble water-dispersible material is required. When the organic amino compound and the aldehyde or ketone are precondensed, it is convenient to carry out the reaction at reflux temperature and atmospheric pressure for from 25 minutes to about 1 hour although some of the organic amino compounds such as urea are more safely condensed at somewhat lower temperatures with the end point depending on viscosity measurements. The temperature of the reaction between the polyamide acids and the condensation products may range from 50° to about 95° C. Preferably the reaction is carried out at about 80–90° C. The pH control for the precondensates will vary according to the organic amino compound used and the result desired. For example, with melamine the pH should range from 8–10 but for urea it may be desirable to carry out a two-phase reaction, the first being at a pH of from 7–8 and the second from 5–7 followed by neutralization of the condensation product.

As a general rule no catalysts are needed for the reactions to produce the resins of this invention or to cure the resins to the insoluble infusible state. The final cure occurs on heating the compositions to from 100° to 250° C. without catalyst. The curing should be done under pressures of at least 25 p. s. i. to insure a dense molded article. Of course, when used as a sizing agent for paper, textiles etc., pressure is not ordinarily necessary during the curing step.

The compositions of this invention may be modified by the addition thereto of conventional additives such as pigments, lubricants, dyes, fillers, and natural or synthetic resins. They may also be modified by reaction thereof with such materials as are commonly known to react with aminoplasts. Thus the compositions may be modified by reaction with alcohols, phenols, aryl sulfonamides, etc. As shown in the examples, these modifiers may be reacted with the organic amino compound and aldehyde or ketone prior to the reaction with the polyamide acids or they may be included with all of the ingredients in a single charge to the reaction vessel and the entire reaction carried out at the same time.

The hydrophobe point mentioned throughout the examples as a method for controlling the reaction is ascertained by placing a drop of the reaction mixture into a large amount of water at a relatively cool temperature. If a cloud or haze appears in the water, the end-point is reached. The hydrophobe test may be carried out at any temperature from 0° C. to 25° C. The 0° C. hydrophobe point used in the examples provides a convenient and reasonably accurate control of the reaction.

In preparing the latices to be used per se, it is convenient to control the particle size by the addition to the reaction medium of an ionic emulsifying agent such as sodium oleate or a non-ionic emulsifying agent such as glyceryl monoricinoleate as shown in the examples. These added emulsifying agents do not contribute substantially to the stability of the latices nor do they affect the dispersibility of the resin in water. Thus the latices may be prepared without the addition of the secondary emulsifiers and the dried resins may be redispersed in water without added emulsifiers.

The products of this invention may be used in molding powders, adhesives, surface coatings, laminating syrups, paper sizes and textile sizes. They have relatively high flow properties under heat and pressure and when cured are highly resistant to solvents, acids, alkalies and water.

What is claimed is:

1. A thermosetting composition of matter consisting essentially of a heat reaction product of an organic amino compound taken from the group consisting of urea, thiourea, cyclic ethylene urea, dicyandiamide, melamine and alkyl and aryl melamines in which each amino group contains at least one active hydrogen atom with a carbonyl compound taken from the group consisting of aldehydes and ketones and with an organic polymer having a molecular weight of at least 10,000 and containing a plurality of side-chain carboxylic acid groups and a plurality of side-chain carbonamide groups, said polymer containing at least 10 carboxylic acid groups and from 1 to 15% nitrogen by weight, the carbonyl compound being present in the amount of 0.2–1.0 mol for each reactive hydrogen atom contained in the organic amino compound and the organic polymer being present in the amount of 0.1–25% of the combined weight of the organic amino compound and the carbonyl compound.

2. A composition as in claim 1 wherein the organic compound is urea.

3. A composition as in claim 1 wherein the organic compound is melamine.

4. The composition as in claim 1 wherein the carbonyl compound is formaldehyde.

5. A composition as in claim 1 wherein the organic polymer is derived from polyacrylonitrile by the partial hydrolysis thereof.

6. A composition as in claim 1 wherein the organic polymer is an amidated copolymer of isobutylene and maleic anhydride.

7. A composition as in claim 1 wherein an alcohol is an additional reactant.

8. A composition as in claim 1 wherein an aryl sulfonamide is an additional reactant.

9. A process for preparing a thermosetting composition which consists essentially of reacting an organic amino compound with a carbonyl compound and an organic polymer at a pH of from 7.5–9 and a temperature of from 50° C. to reflux temperature at atmospheric pressure, said organic amino compound being taken from the group consisting of urea, thiourea, cyclic ethylene urea, dicyandiamide, melamine and alkyl and aryl melamines in which each amino group contains at least one active hydrogen atom, said carbonyl compound being taken from the group consisting of aldehydes and ketones, and said organic polymer having a molecular weight of at least 10,000 and containing a plurality of side-chain carboxylic acid groups and a plurality of side-chain carbonamide groups, said polymer containing at least 10 carboxylic acid groups and from 1 to 15% nitrogen by weight, the carbonyl compound being present in the amount of 0.2–1.0 mol for each reactive hydrogen atom contained in the organic amino compound and the organic polymer being present in the amount of 0.1–25% of the combined weight of the organic amino compound and the carbonyl compound.

10. A latex containing a thermosetting composition prepared by reacting an organic amino compound with a carbonyl compound and an organic polymer at 50° C. to reflux temperature at atmospheric pressure and at a pH of from 7.5–9, said reaction being carried out in an aqueous medium with further addition of water being made at the termination of the reaction at a temperature of from 80–120° C., said organic amino compound being taken from the group consisting of urea, thiourea, cyclic ethylene urea, dicyandiamide, melamine and alkyl and aryl melamines in which each amino group contains at least one active hydrogen atom, said carbonyl compound being taken from the group consisting of aldehydes and ketones, and said organic polymer having a molecular weight of at least 10,000 and containing a plurality of side-chain carboxylic acid groups and a plurality of side-chain carbonamide groups, said polymer containing at least 10 carboxylic acid groups and from 1–15% nitrogen by weight, the carbonyl compound being present in the amount of 0.2–1.0 mol for each reactive hydrogen atom contained in the organic amino compound and the organic polymer being present in the amount of 0.1–25% of the combined weight of the organic amino compound and the carbonyl compound.

References Cited in the file of this patent

UNITED STATES PATENTS

| | | |
|---|---|---|
| 2,205,355 | Grimm | June 18, 1940 |
| 2,328,901 | Grimm | Sept. 7, 1943 |
| 2,469,408 | Powers | May 10, 1949 |
| 2,504,003 | Cuprey | Apr. 11, 1950 |
| 2,653,140 | Allenby | Sept. 22, 1953 |

FOREIGN PATENTS

| | | |
|---|---|---|
| 937,468 | France | Mar. 8, 1948 |